Figure 1:
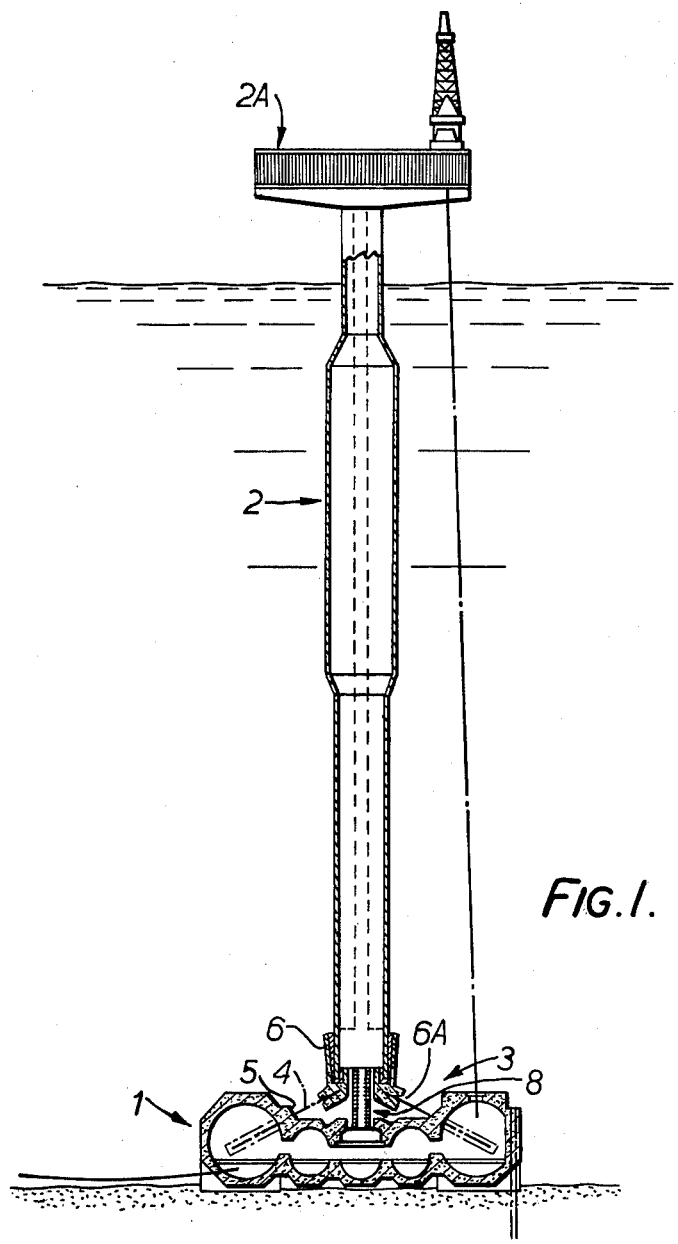

United States Patent [19]

Taylor et al.

[11] 4,069,682

[45] Jan. 24, 1978

[54] ARTICULATED JOINTS FOR DEEP WATER INSTALLATIONS

[75] Inventors: Reginald Sidney Taylor, Gerrards Cross; Reginald Edward Dowton Burrow, Hatch End, both of England

[73] Assignee: Taylor Woodrow Construction Limited, England

[21] Appl. No.: 705,934

[22] Filed: July 16, 1976

[30] Foreign Application Priority Data

July 17, 1975 United Kingdom ............... 30124/75

[51] Int. Cl.² ............................................. E02B 17/00
[52] U.S. Cl. .......................................... 61/95; 61/101
[58] Field of Search ................. 61/95, 101, 87, 69; 175/7, 8; 166/.5, .6

[56] References Cited

U.S. PATENT DOCUMENTS

| 3,522,709 | 8/1970 | Vilain | 61/95 |
| 3,563,042 | 2/1971 | Ryan | 61/95 |
| 3,875,998 | 4/1975 | Charpentier | 175/8 |

*Primary Examiner*—Jacob Shapiro
*Attorney, Agent, or Firm*—Armstrong, Nikaido & Marmelstein

[57] ABSTRACT

An articulated joint for a deep water installation in which two structural members are connected by flexible tendons and there is access from one of the members to the other via a hollow shaft.

17 Claims, 6 Drawing Figures

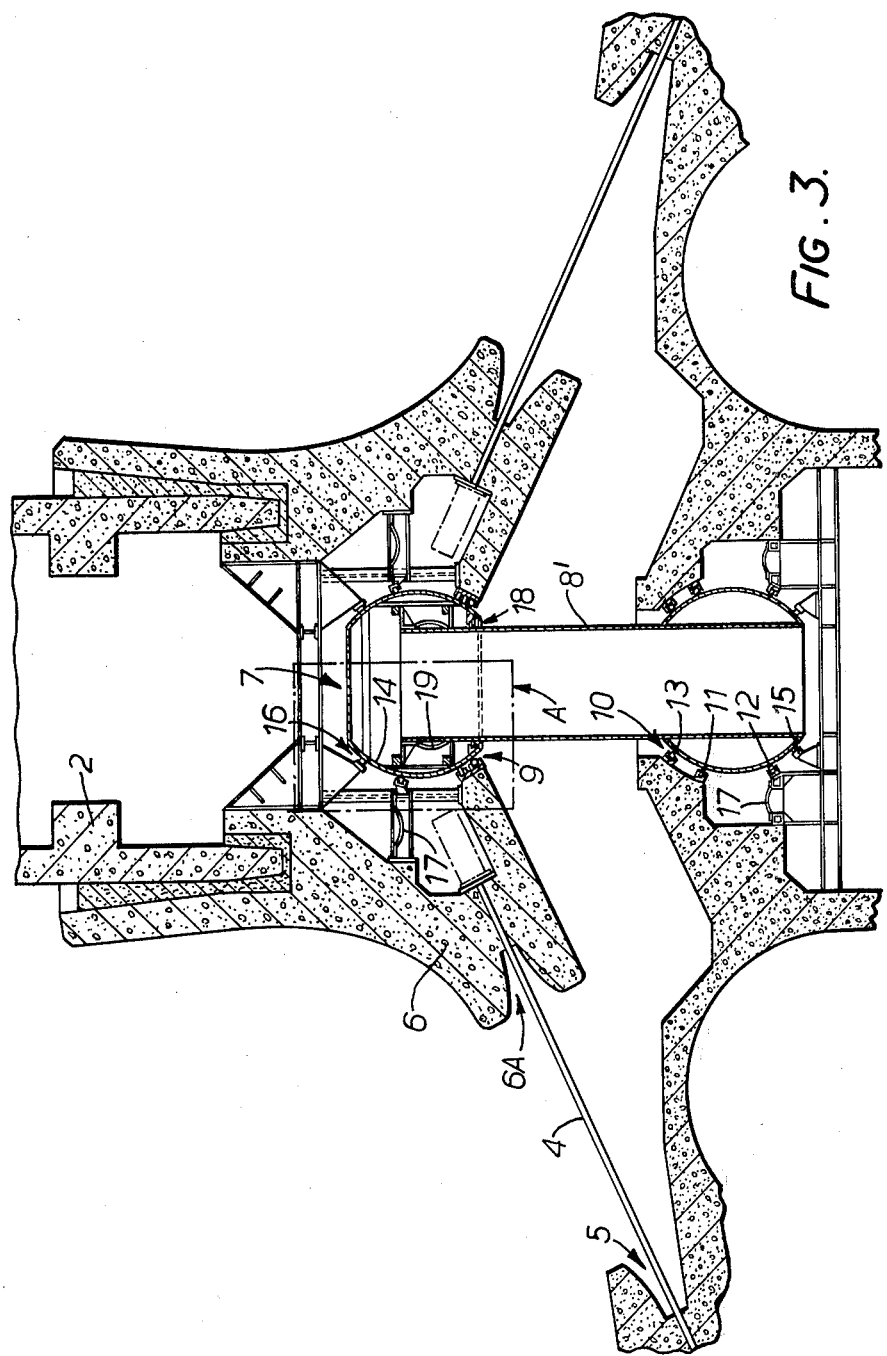

ARTICULATED JOINTS FOR DEEP WATER INSTALLATIONS

This invention relates to articulated joints for use in connecting structures in installations for the extraction of oil and gas from deep water sites such as the edges of continental shelves and slopes, and is particularly concerned with such a joint in which there is provided a means of access through the joint at atmospheric pressure for men, plant and materials to pass between the structures connected by the joint.

According to the present invention there is provided an articulated joint for a deep water installation in which two hollow structural members are connected so as to afford limited pivotal movement between the members; the joint comprising flexible tendons connecting the structural members with a clearance between the members, and a hollow convoluted shaft permitting access of men or materials from one of the structural members to the other through the joint, this shaft being sealed in fluid-tight manner to each of the members and being formed by spaced-apart plates connected in fluid-tight manner by members of substantially toroidal form able to withstand hydrostatic pressure in the form of hoop stress and bending stresses resulting from relative motion of the two members. Preferably, between one end portion of said hollow convoluted shaft and one of said members, and also between the other end portion of said shaft and the other of said members, there is provided a seal assembly comprising a primary seal and a secondary seal located inside the primary seal relative to the seal assembly as a whole, the primary and secondary seals each affording a seal capable of withstanding a predetermined hydrostatic pressure which, in use, prevails around the outside of the joint and being arranged such that normally the primary seal insulates the secondary seal from the hydrostatic pressure, there being further provided in each seal assembly an outer sealing arrangement outside the primary seal which for normal operation is capable of being kept in a non-sealing condition and which is adapted to be rendered operable to form a seal capable of withstanding the predetermined hydrostatic pressure thereby to isolate the primary seal from the hydrostatic pressure. In a form in which these seal assemblies are provided the convoluted shaft is replaced by a rigid shaft.

Figure 2:
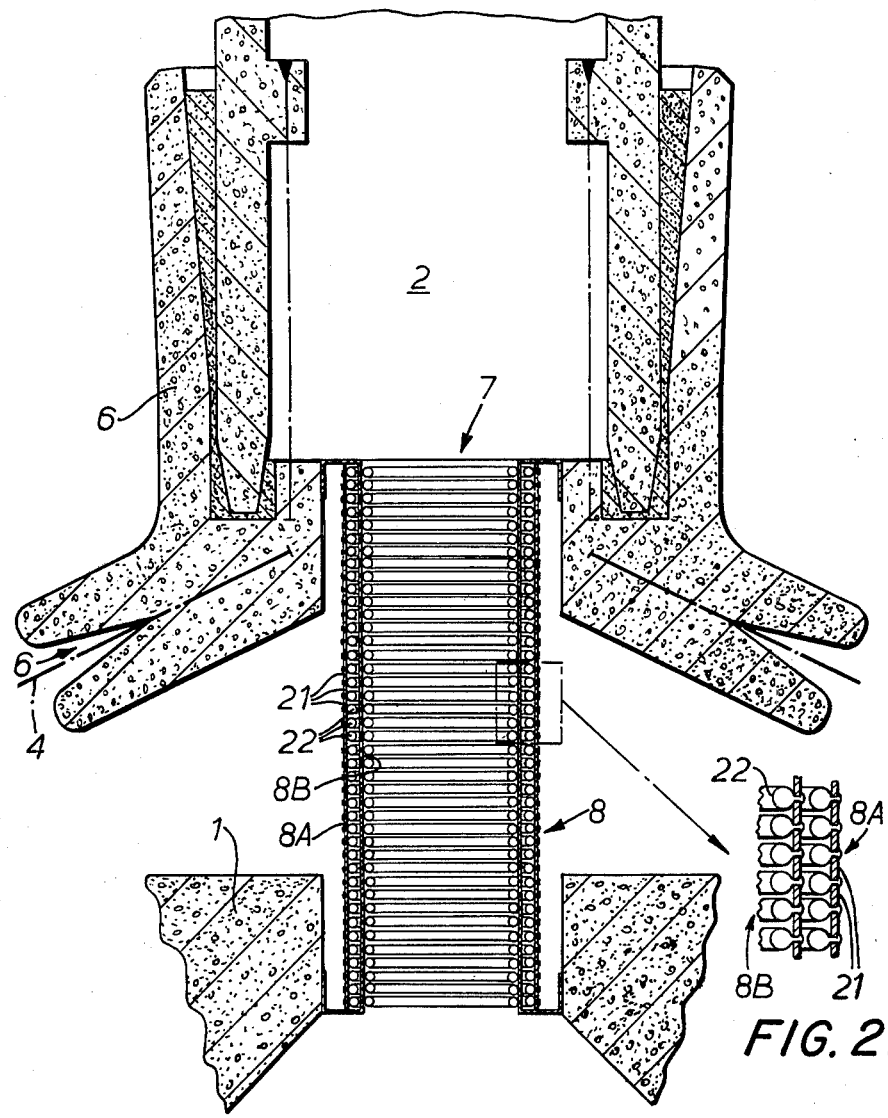
Figure 3A:
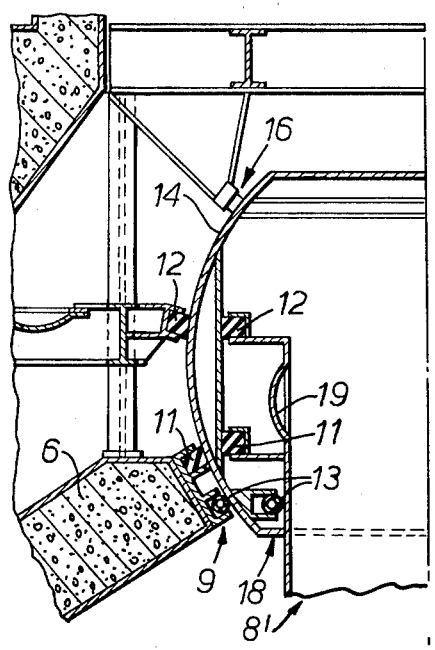
Figure 3B:
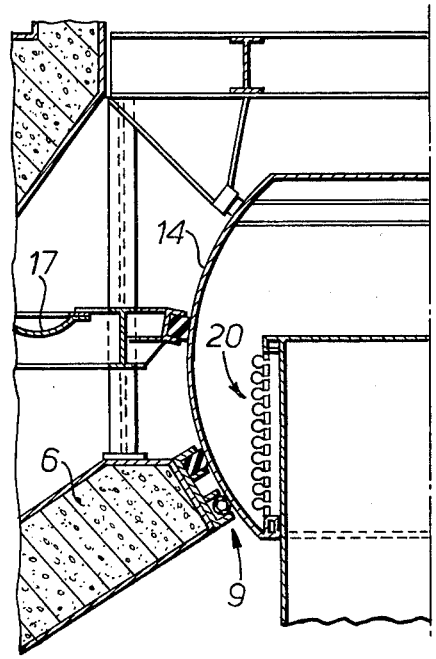

For a better understanding of the invention and to show how the same may be carried into effect, reference will now be made, by way of example, to the accompanying drawings, in which:

FIG. 1 illustrates in diagrammatic sectional side view an assembly consisting of a foundation member shown placed on the sea bed and an upright column pivotally connected by a joint to the foundation member and supporting above the surface of the sea a deck superstructure, FIG. 2 and 2A is a diagrammatic sectional side view on a large scale than FIG. 1 and showing a shaft assembly that is incorporated in the joint of the assembly of FIG. 1, FIG. 3A is a sectional side view of detail A of FIG. 3, drawn to a larger scale, and FIG. 3B is a diagrammatic sectional side view also of detail A of FIG. 3 but illustrating a further form of joint again shown with the single shaft of FIG. 3.

In the assembly illustrated in FIG. 1 the foundation member is referenced 1, the upright column is referenced 2, the joint between the foundation member and the column is referenced 3, and the deck superstructure is referenced 2A. In this particular assembly which is described in greater detail in U.S. patent application Ser. No. 655,981 the foundation member 1 is constructed as a housing for the well heads of so-called "subsea completions". The member 1 and the column 2 are of prestressed concrete.

The joint 3 between the member 1 and the column 2 is also described in the Patent Application just mentioned. The joint includes tendons 4, preferably of a high strain capability synthetic plastics material, extending from the upper surface of the foundation member 1, through fairleads 5 in this upper surface, upwardly and inwardly to fairleads 6A around the circular base of a concrete socket 6, the tendon being anchored at individual anchorages in the members 1 and 6. This arrangement of tendons permits limited rotation of the column 2 about its axis relative to the foundation member 1 of up to 10° or 15°, and swinging movement, and also slight translational and vertical movement of the column relative to the foundation member, these various degrees of freedom permitting the joint between the column and the foundation member to accommodate movement as a result of water and wind motion.

Referring now to FIG. 2, a passage 7 through the joint to permit access of men, materials or plant to the foundation member 1 from the column 2 is formed by the shaft assembly 8 which in the form shown in FIG. 2 and 2A is made up of two convoluted shafts 8A, 8B able to cope with vertical, horizontal and rotational movement, and to resist external hydrostatic pressure. If desired only one or more than two such shafts can be provided. Where there are two or more such shafts they are disposed concentrically with the number of shafts selected to achieve the required degree of redundancy.

The outer surface of the or each convoluted shaft is formed by plates 21 with spaces between them to permit vertical movement. These plates 21 are connected together by oil-filled members 22 of substantially toroidal form each able to withstand hydrostatic pressure in the form of hoop stress, and also the bending stresses resulting from vertical, horizontal and rotational movement. Where there are two or more such shafts disposed concentrically, the annulus between them is filled with oil to assist in preservation of the shaft components, and replacement of the inner shaft(s) is possible. A flexible membrane is mounted over the external surfaces to retain oil within the members 22.

In the form of FIG. 2 the shaft assembly 8 is made directly fast at each end portion, in fluid-tight manner, either with the foundation member 1 or with the socket 6 of the column 2. It is to be understood, however, that the shaft assembly of FIG. 2 can be utilised in any of the forms of joint next to be described in place of the single shaft which is shown in the Figures depicting these forms.

Referring next to FIGS. 3 and 3A, the single rigid shaft 8' which is depicted passes, near its upper end, through a seal assembly 9 between the shaft and the socket member 6. Near its lower end the shaft 8' passes through a similar seal assembly 10 between the shaft and the foundation member 1. Each seal assembly 9, 10 includes a primary seal 11 and a secondary seal 12 that is located inside the primary seal 11 with respect to the seal assembly as a whole, each of these seals affording a seal capable of withstanding a predetermined hydrostatic pressure which, in use, prevails around the outside of the joint. The primary seal 11 normally isolates the secondary seal 12 from this hydrostatic pressure. Each seal assembly 9, 10 also includes a further sealing arrangement 13 outside the primary seal 11 which for normal operation is capable of being kept in a non-sealing condition and which is adapted to be rendered operable to form a seal capable of withstanding the predetermined hydrostatic pressure thereby to isolate the primary seal 11 from the hydrostatic pressure. Thus, in the joints there are provided at each end of the shaft 8' three barriers capable of isolating the interior of the shaft 8' and the structures it interconnects from the surrounding water pressure, each barrier separately being able to carry the full hydrostatic pressure loading and each constituted by an independent seal.

The particular seal assemblies 9 and 10 of the joint of FIGS. 3 and 3A will now be described in greater detail. These assemblies are such as to permit pivotting movement to take place between the member 6 and the shaft 8', and between the member 1 and the shaft 8'. To this end, in each assembly 9, 10 each seal or sealing arrangement 11, 12, 13 has a single seal member that engages a part-spherical bearing member 14. In the case of the lower assembly 10, this bearing member 14 is rigid with the lower end of the shaft 8'. In the case of the upper assembly 9, the bearing member 14 is slidably mounted on the upper end of the shaft 14 as will be described below. The lower bearing member 14 is supported by a thrust bearing 15 mounted in the foundation member 1 and a similar thrust bearing 16 carried by the socket member 6 acts on the upper bearing member 14.

The seal members of the primary and secondary seals 11 and 12 are each preferably formed of a multiple chevron arrangement of rubber sealing ring elements which can be separated for replacement, and are fitted with reinforced wearing surfaces. The seal members of the sealing arrangements 13 are each a hollow inflatable rubber sealing ring. The rubber of all the seal members is preferably fabric reinforced rubber.

The seal members of the sealing arrangements 13 of the two assemblies are normally deflated, but can be inflated when required by suitable air supply equipment (not shown)

In normal use, only the primary seals 11 withstand the hydrostatic water pressure and they isolate the secondary seals 12. The secondary seals 12 are, however, in sealing engagement at all times and thus between the passage 7 (through the shaft 8') at atmospheric pressure and the surrounding water there is the safeguard of having two seals each independently capable of withstanding the entire hydrostatic pressure. As long as the primary seals 11 are watertight the secondary seals 12 have not pressure differential across them and consequently are not subject to wear.

If leakage occurs past one or other of the primary seals 11, water enters the chamber formed between the primary and secondary seals 11 and 12 and is pumped from this chamber via ducts not shown, monitoring means being provided to give an indication of the leakage rate. If leakage occurs at a rate too great to be coped with by the pumps, or if one of the primary seals fails all together, no danger will result since the associated secondary seal will be operative.

For maintenance or repair of either of the primary seals 11, the associated outer sealing arrangement 13 is brought into operation, being inflated as described so as to isolate the primary seal 11 from the hydrostatic pressure. Since the seal members of the outer sealing arrangements 13 are not normally under pressure they do not become worn and are therefore always in good condition for reliable sealing when required.

Once the outer sealing arrangement in question has become effective, hatches 17 giving access from the interior of the column 2 or the foundation member 1 to the chambers between the seals 11 and 12 are opened to give access to the or each seal 11 that is in need of maintenance or that has failed.

As stated above, the shaft 8' can slide through the upper bearing member 14. Between this bearing member 14 and the shaft 8' there is a seal assembly 18 that is such as to allow the shaft 8' to slide through this seal assembly. In the form depicted in FIGS. 3 and 3A, the assembly 18 is similar to the seal assemblies 9, 10 already described, having primary and secondary seals 11 and 12 and a further sealing arrangement 13 all similar to what has already been described. A hatch 19 in the upper end of the shaft 8' gives access to the chamber between the seals 11 and 12 of the assembly 18.

In the further form of joint depicted in FIG. 3A it is the seal assembly 18 that is of different form, the remainder of the joint being as already described. In this form the seals and seal arrangement 11, 12 and 13 are replaced by a convoluted shaft 20 rigid in fluid tight manner at its lower end with the bottom rim of the bearing member 14 and at its upper end with the upper end of the shaft 8'. The shaft 20 is constructed in the manner described for the shafts 8A, 8B of FIG. 2.

It will be appreciated that in each of the forms of joint described with reference to FIGS. 3, 3A and 3B, two zones of pivotal movement are provided, at the seal assemblies 9 and 10 respectively. In addition a change in the distance between these two zones can occur, accommodated by sliding movement of the shaft 8' through the seal assembly 18, or expansion and contraction of the convoluted shaft 20. A system of tendons (not shown) is provided to limit this movement of the shaft 8', these tendons anchoring the shaft 8' to one or both of the member(s) 1 and/or 6.

Where the shaft 8 of FIG. 2 is substituted for the shaft 8' it is provided with rigid end portions for co-operation with the bearing members 14.

In the use of the joints as so far described that is illustrated in FIG. 1, the joint is between a foundation member and a column, and is disposed at the sea bed. A further joint could be provided along the length of the column, for example approximately mid-way up the column, or at the top of the column to secure to the column a floating deck structure. The shaft as so far described is straight, but it could be cranked by up to 90°.

We claim:

1. An articulated joint for a deep water installation in which two hollow structural members are connected so as to afford limited pivotal movement between the members; the joint comprising flexible tendons connecting the structural members with a clearance between the members, and a hollow convoluted shaft permitting access of men or materials from one of the structural members to the other through the joint, this shaft being sealed in fluid-tight manner to each of the members and being formed by spaced-apart plates connected in fluid-tight manner by members of substantially toroidal form able to withstand hydrostatic pressure in the form of hoop stress and bending stresses resulting from relative motion of the two members.

2. A joint as claimed in claim 1, wherein the members of substantially toroidal form are filled with oil.

3. A joint as claimed in claim 1, wherein said hollow convoluted shaft is one of a plurality of such shafts disposed in concentric relationship.

4. A joint as claimed in claim 3, wherein the members of substantially toroidal form, and the annulus between the or each pair of shafts, and/is filled with oil.

5. A joint as claimed in claim 1, wherein said hollow convoluted shaft is directly fast in fluid-tight manner, at one end portion with one of said members and at the other end portion with the other of said members.

6. A joint as claimed in Claim 1, wherein between one portion of said hollow convoluted shaft and one of said members, and also between the other end portion of said shaft and the other said members, there is provided a seal assembly comprising a primary seal and a secondary seal located inside the primary seal relative to the seal assembly as a whole, the primary and secondary seals each affording a seal capable of withstanding a predetermined hydrostatic pressure which, in use, prevails around the outside of the joint and being arranged such that normally the primary seal isolates the secondary seal from the hydrostatic pressure, there being further provided in each seal assembly an outer sealing arrangement outside the primary seal which for normal operation is capable of being kept in a non-sealing condition and which is adapted to be rendered operable to form a seal capable of withstanding the predetermined hydrostatic pressure thereby to isolate the primary seal from the hydrostatic pressure.

7. An articulated joint for a deep water installation in which two hollow structural members are connected so as to afford limited pivotal movement between the members, the joint comprising flexible tendons connecting the structural members with a clearance between the members, and a hollow rigid shaft permitting access of men or materials from one of the structural members to the other through the joint, there being provided between one end portion of said shaft and one of said members, and also between the other end portion of said shaft and the other of said members, a seal assembly comprising a primary seal and a secondary seal located inside the primary seal relative to the seal assembly as a whole, the primary and secondary seals each affording a seal capable withstanding a predetermined hydrostatic pressure which, in use, prevails around the outside of the joint and being arranged such that normally the primary seal isolates the secondary seal from the hydrostatic pressure, there being further provided in each seal assembly an outer sealing arrangement outside the primary seal which for normal operation is capable of being kept in a non-sealing condition and which is adapted to be rendered operable to form a seal capable of withstanding the predetermined hydrostatic pressure thereby to isolate the primary seal from the hydrostatic pressure.

8. A joint as claimed in claim 6, wherein each seal assembly further comprises a part-spherical bearing member that is in fluid-tight relationship with said shaft and with which the primary and secondary seals, and the outer sealing arrangement when operative, co-operate in a manner such that pivoting movement can take place between each of said two structural members and said shaft.

9. A joint as claimed in claim 8, wherein one of the part-spherical bearing members is slidably mounted, in fluidtight manner on said shaft.

10. A joint as claimed in claim 9, wherein said one partspherical bearing member is sealed to said shaft by means of a seal assembly comprising a primary seal and a secondary seal located inside the primary seal, the primary and secondary seals each affording a seal capable of withstanding a predetermined hydrostatic pressure which, in use, prevails around the outside of this assembly and being arranged so that normally the primary seal isolates the secondary seal from the hydrostatic pressure, there being further provided in this seal assembly an outer sealing arrangement outside the primary seal which for normal operation is capable of being kept in a non-sealing condition and which is adapted to be rendered operable to form a seal capable of withstanding the predetermined hydrostatic pressure thereby to isolate the primary seal from the hydrostatic pressure.

11. A seal as claimed in claim 9, wherein said one partspherical bearing member is sealed to said shaft by means of a hollow convoluted shaft directly fast in fluid-tight manner at one end portion with said one part-spherical bearing member and at the other end portion with said shaft.

12. A joint as claimed in claim 6, wherein there is associated with each said seal assembly a hatch that can be opened to give access to a chamber between the primary and secondary seals when the outer sealing arrangement is operative.

13. A joint as claimed in claim 6, wherein the primary and secondary seals of each said seal assembly comprise seal members each formed of a multiple chevron arrangement of rubber sealing ring elements fitted with reinforced wearing surfaces.

14. A joint as claimed in claim 6 wherein the outer sealing arrangement of each assembly comprises a seal member that is a hollow inflatable rubber ring.

15. A joint as claimed in claim 6, wherein the two structural members are of reinforced and/or prestressed concrete.

16. A joint as claimed claim 6, wherein the tendons are of a synthetic material of high strain capability.

17. A joint as claimed in claim 6, wherein the tendons are anchored in the structural members so as to be releasable for replacement.

* * * * *